July 12, 1949.　　　　　D. M. LAWRENCE　　　　　2,476,198
ICE ELIMINATING SYSTEM AND OIL
SEPARATOR OPERATIVE THEREIN
Filed March 31, 1945　　　　　　　　　　　　　　5 Sheets-Sheet 1

Fig. 1.

Inventor
Donald M. Lawrence
By Herbert L. Davis, Jr.
ATTORNEY

Fig. 4.

Patented July 12, 1949

2,476,198

UNITED STATES PATENT OFFICE 2,476,198

ICE ELIMINATING SYSTEM AND OIL SEPARATOR OPERATIVE THEREIN

Donald M. Lawrence, Newark, N. J., assignor to Bendix Aviation Corporation, Teterboro, N. J., a corporation of Delaware Application March 31, 1945, Serial No. 585,941

15 Claims. (Cl. 244—134)

1

The present invention relates to inflatable ice eliminating systems for aircraft and more particularly to a novel operating system, oil separator and air filter for preventing oil, other liquids, and dirt from entering the inflatable elements of the system. Such elements are ordinarily composed of rubber and therefore, will deteriorate, if particles of oil are permitted to enter the shoes with the inflating air supply from the air pump.

An object of the invention is to provide a novel electrically controlled oil separator and air filter device, particularly adapted for use with an electrically controlled system such as shown in the copending application Serial No. 498,248, filed August 11, 1943, by Donald M. Lawrence, David Gregg and Myron L. Taylor.

Another object of the invention is to provide a novel solenoid operated separator and filter device.

Another object of the invention is to provide a novel separator and filter device so arranged that the device may be placed in an operative condition, only at such times as the ice eliminating system is in an operating condition, so as to increase the life of the filter material and reduce the size of the device.

Another object of the invention is to provide in a compact assemblage a novel oil separator and air filter.

Another object of the invention is to provide a novel device combining a solenoid operated three way valve, with a pressure control and a combination centrifugal and absorption type oil separator having an air and oil discharge passage to an overboard dump.

Another object of the invention is to provide in an oil separator a controlled discharge air passage leading to an overboard dump and having provided therein, a check valve leading from a sump for the separated oil and arranged to allow the oil to bleed to the overboard dump upon the air discharge passage being closed and said check valve arranged to close the bleed upon the air discharge passage being opened.

Another object of the invention is to provide a combination centrifugal oil separator and air filter of great efficiency in comparison to its size and of such simplicity in construction, as to adapt it for manufacture and installation at low cost.

These and other objects and features of the invention are pointed out in the following description in terms of the embodiment thereof which is shown in the accompanying drawings. It is to be understood, however, that the draw-

2 ings are for the purpose of illustration only, and are not designed as a definition of the limits of the invention, reference being had to the appended claims for this purpose.

Figure 1:
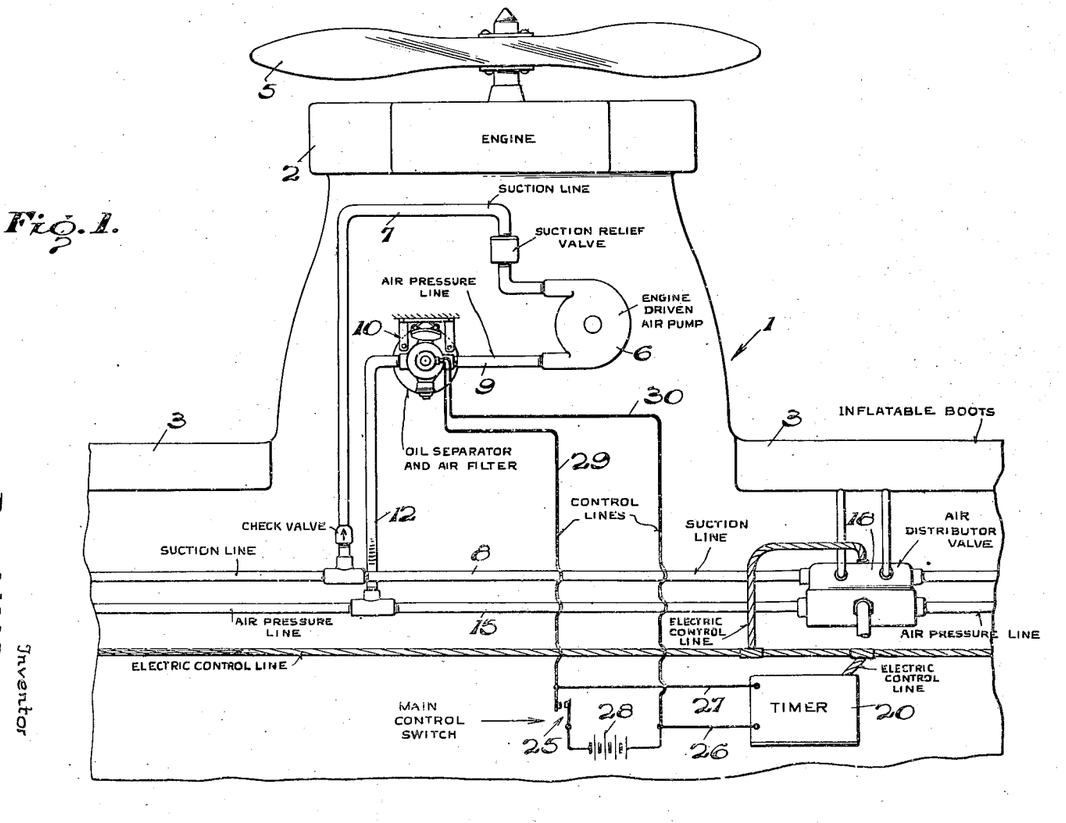
Figure 1 is a fragmentary plan view of an aircraft showing diagrammatically the manner in which the novel air filter and oil separator is connected into the inflatable ice eliminating system.

Referring to the drawing of Figure 1, there is shown an aircraft indicated by the numeral 1 having an engine 2 and inflatable boots 3 mounted along the leading edge of the plane as shown, for example, in the copending application Serial No. 498,248, filed August 11, 1943, by Donald M. Lawrence, David Gregg and Myron L. Taylor.

The engine 2 is arranged so as to drive an aircraft propeller 5. An air pump 6 is also driven by the engine 2 and has provided a suction conduit 7 leading to the main suction line 8 through suitable relief and check valves, as shown.

An air pressure line 9 leads from the pump 7 to the inlet of an oil separator and air filter indicated generally by the numeral 10. The air passes through the device 10 and during operation of the ice eliminating system into the outlet conduit 12. During the passage of the air through the device 10, any particles of oil which may enter the air from the pump 10 or other source, is separated and the air is filtered from dirt and other extraneous matter. The air flow thus processed, is conducted through the conduit 12 to the main air pump line 15.

The main suction and air pressure lines 9 and 15 lead to suitable air distributor valves 18 which are electrically controlled by a timer indicated generally by the numeral 20 so as to operate the inflatable boot elements 3. A plurality of such distributor valves are preferably provided of a type such as shown in the aforenoted copending application. The timer 20 may be of the type shown in the latter copending application or may be of a type such as shown in the copending application Serial No. 498,250 filed August 11, 1943, now Patent No. 2,444,208, by Myron L. Taylor, William B. Pond and Herbert A. Eayrs. The operation of the timer is described in detail in the aforenoted copending applications.

A manually operable switch 25 is arranged to control the operation of the timer, as will be readily apparent, through electrical conductors 26 and 27 leading from a source of electrical energy 28 while operation of the oil separator and air filter 10 is controlled simultaneously through electrical conductors 29 and 30.

Thus by closing the switch 25 the timer 20 and the device 10 are simultaneously placed in operation by the closing of the circuits 26—27 and 29—30 which control the same. However, when switch 25 is open, the device 10 is arranged so as to direct the air flow from the conduit 12 to an overboard dump as will be explained hereinafter.

Figure 2:
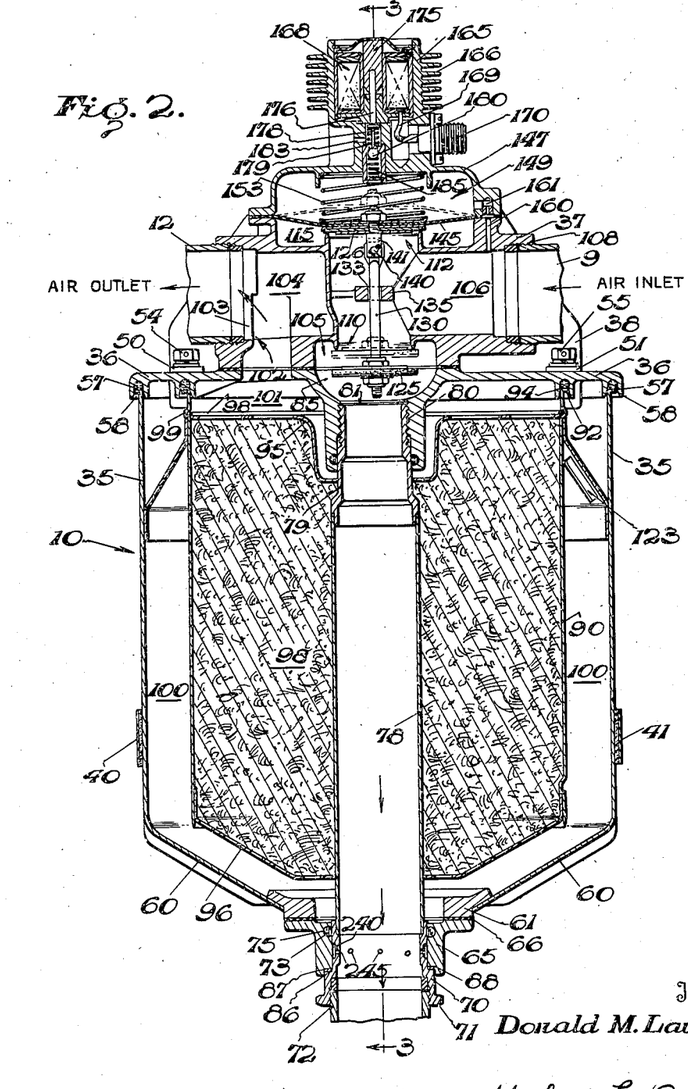
Figure 2 is a sectional view of the device taken along the lines 2—2 of Figure 3.
Figure 3:
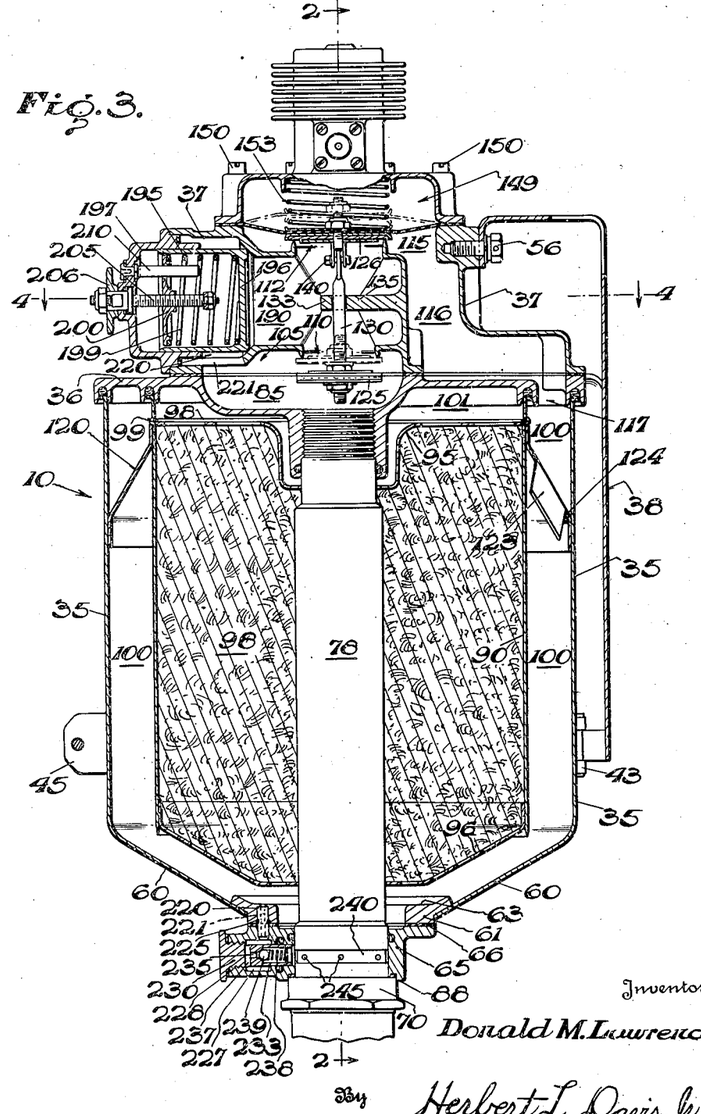
Figure 3 is a sectional view of Figure 2 taken along the lines 3—3 and with certain parts shown in full.
Figure 4:
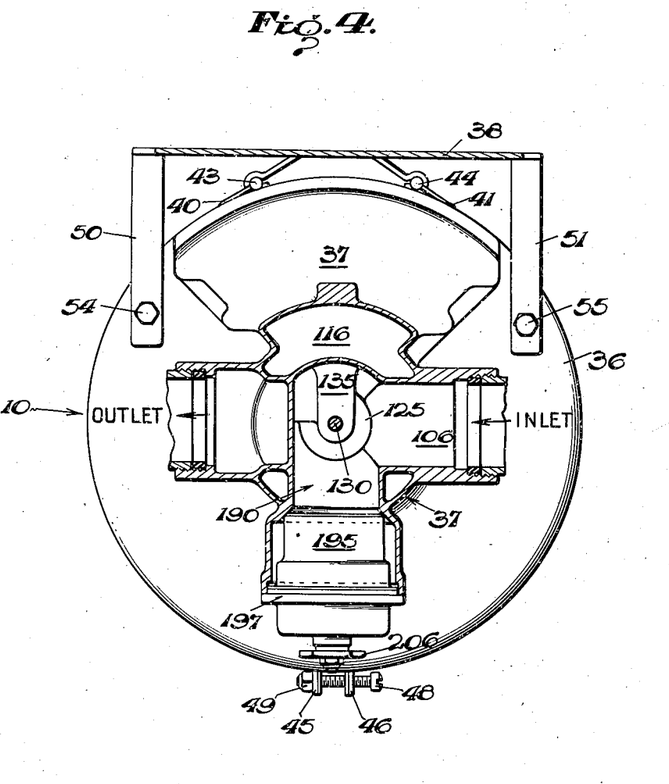
Figure 4 is a sectional view of Figure 3 taken along the lines 4—4 with certain parts shown in full.

The device 10, as shown in Figures 2, 3, and 4 includes a casing 35 having a top plate 36 and manifold block 37 mounted thereon. The casing 35 is fastened to a mounting bracket 38 by straps 40 and 41. The straps 40 and 41 are fastened to the bracket 38 by hinged portions 43 and 44, respectively.

At the opposite ends of the straps 40 and 41 are projecting ears 45 and 46, in which is screw threadedly mounted a fastening screw 48 projecting through the latter ears and having a nut 49 for securing the straps 40 and 41 about the casing 35. The supporting bracket 38 has projecting arms 50 and 51 which are fastened to the top plate 36 by bolts 54 and 55, respectively, as shown in Figures 2 and 4. The supporting bracket 38 is also fastened to the manifold block 37 by a bolt 56.

The casing 35 has its upper annular end 57 suitably engaged in an annular groove 58 formed in the end plate 36. An opposite bottom portion of the casing 35 is formed by the inwardly and downwardly extending sides 60. Concentrically fastened in the bottom portion 60 of the casing 35 by suitable means is an annular member 61 having an annular recessed portion 63. A second member 65 closes the lower end of the recess 63 so that the same forms a cup like receptacle for a purpose to be described hereinafter. A suitable sealing gasket 66 is positioned between the members 61 and 65 and the members 61 and 65 are conveniently fastened together by screws or other suitable means.

A tubular member 70 projects into the member 65 in concentric relation therewith. Formed within the outer end of the tubular member 70 are screw threads 71 which are engaged by a screw threaded end of a conduit 72 leading to an overboard dump of the aircraft. An annular groove 73 formed within the member 65 is adapted to receive an annular sealing ring 75 formed of a suitable plastic material such as rubber and constricted about the tubular member 70.

Fastened at the inner end of the tubular member 70 is one end of a second tubular member 78. The opposite upper end of the tubular member 78 is fastened to a third tubular member 79 which is in turn screw threadedly engaged at 80 in an opening 81 formed in a recessed portion 85 of the top plate 36. The opposite outer end of the tubular member 70 has a flanged portion 86 which bears upon a sealing ring 87 positioned in a recess 88 formed in the member 65.

Extending from the top plate 36 is a second casing 90 having its upper annular end 92 suitably engaged in an annular groove 94 formed in the end plate 36. The casing 90 is positioned within and in spaced relation to the casing 35 and has suitably apertured upper and lower end plates 95 and 96, respectively.

The lower end plate 96 is fastened in position by suitable means, not shown. There is disposed within the casing 90 a filter pack 98 formed of a suitable material such as cellulose cotton material arranged to absorb oil vapor. There may also be positioned in the casing 90 at the upper end of the cellulose cotton material, a suitable layer of activated carbon or some other type of vapor absorbing material. There is thus provided in the casing 90 a filter pack 98 which may be held in position by the top plate 95. The top plate 95 is fastened in position by a snap split ring 98 which engages in an annular groove 99 formed in the casing 90.

As shown in Figures 2 and 3, the inner casing 90 and bottom plate 96 are positioned in space relation to the inner surface of the outer casing 35 so as to define a passage between the inner and outer casing indicated by the numeral 100. The tubular member 78, moreover, is positioned in concentric relation to the inner and outer casings 35 and 90 and extends longitudinally to the upper and lower tubular members 79 and 70 previously described. Between the perforated top plate 95 and plate 36 is provided a chamber 101 which, as shown in Figure 2, opens through a port 102 in the plate 36 into a cored passage 103 formed in the manifold block 37. The cored passage 103 opens into an outlet passage 104 formed in the manifold block 37. There is screw threadedly engaged in the passage 104 one end of the pressure conduit 12.

The upper end of the tubular member 79 opens into the recess 85, as previously described. There is further formed in the manifold block 37 a recess 105 cooperating with the recess 85 formed in the top plate 36. The manifold block 37 is positioned on a sealing gasket between the top plate 36 and manifold block 37 and is fastened to the top plate 36 by suitable means.

As shown in Figure 2, the manifold block 37 has an air inlet passage 106 in which there is engaged at the screw threads 108, one end of the pressure conduit 9 leading from the air pump 6. An opening 110 leads from the passage 106 into the recess 105. A second opening 112 leads from the passage 106 into a recess 115 formed in the manifold block 37.

As shown in Figure 3, the recess 115 opens through a cored passage 116 into an opening 117 formed in the top plate 36 and leading into the passage 100 formed between the inner and outer casings 35 and 90.

Positioned in the passage 100 is an annular ring 120 having formed therein a series of radial vanes one of which is indicated in Figure 3 by numeral 123. The vanes 123 project inwardly through slots 124 formed in the ring 120 and are so arranged as to give to the incoming air flow a centrifugal spin for a purpose which will be described hereinafter.

Controlling the ports 110 and 112 are flap valve members 125 and 126. The valve member 125 is affixed to one end of a stem 130 slidably positioned in an opening 133 formed in an arm 135 which projects from the side wall of the passage 106.

The upper end of the stem 130 is pivotally connected at 140 to a second stem portion 141 to which there is affixed the flap valve 126. Supporting the flap valve 126 is a flexible diaphragm member 145 which extends across the recess 115 and is fastened to the manifold block 37 by a cap member 147 having a recess 149 cooperating with the diaphragm 145. The cap member 147 is fastened to the manifold block 37 by suitable screws indicated by numeral 150.

Positioned between the flap valve 126 and the upper inner surface of the cap member 147 is a coil spring 153 which biases the flap valve 126 in a downward direction so as to close the opening 112 and the flap valve 125 in a like direction so as to open the port 110.

A bleed passage 160 leads from the pressure inlet conduit 106 to a bleed passage 161 opening into the chamber 149 formed at the upper side of the diaphragm 145. Thus, normally, the superatmospheric pressure exerted through the passage 106 from the pump 6 is applied to the diaphragm 145 at the chamber 149 through the bleeds 160 and 161 so as to augment the force exerted by the spring 153 and normally hold the flap valve 126 closed.

Projecting from the cap member 147 is a casing 165 having heat radiating fins 166 and housing a solenoid or electromagnet 168 which is electrically connected through the conduit 169 and connector plug 170 with the circuit 29 and 30 previously described with reference to Figure 1.

The solenoid 168 controls the movement of an armature 175 fastened to a slidable push rod 176. A pin 178 slidably mounted in the casing 165 and biased under force of a spring 179 operably connects the push rod to a ball valve 180. The ball valve 180 controls a second bleed passage 183 opening the chamber 149 to atmosphere. The ball valve 180 is normally biased under force of spring 185 to a position closing the bleed passage 183 to the chamber 149. However, upon energization of the solenoid 168, the armature 175 is moved downward actuating the ball valve 180 through rod 176 and pin 178 so as to open the chamber 149 to the atmosphere through the bleed passage 183. The latter action reduces the pressure within the chamber 149 to substantially atmospheric pressure, whereupon the superatmospheric pressure acting on the under side of the flap valve 126 through the opening 112 forces the same to a partially open position. The superatmospheric pressure then acts upon the under side of the diaphragm 145 so as to force the flap valve 126 to a full open position and the flap valve 125 to a full closed position. The difference between the atmospheric and superatmospheric pressures are sufficient to effect the latter operation.

There is further provided, as shown in Figures 3 and 4, a valve opening or port 190 leading from one side of the inlet passage 106. A sleeve valve 195 closed at its inner end 196 is slidably mounted in the supporting member 197. The supporting member 197 is suitably fastened in the manifold block 37. A coil spring 199 biases the sleeve valve 195 in a direction for closing the valve 190.

The spring has one end engaging the inner end of the sleeve valve 196 while the opposite end is supported by a plate 200. The plate 200 is screw threadedly mounted on a screw 205 which is rotatably adjustable by a knob 206. The plate 200 is held from rotary movement by a pin 210 which projects inwardly from the supporting member 197 and into the plate 200 so as to prevent rotary movement of the plate relative to the pin 210, while permitting longitudinal movement of the plate relative thereto in response to rotary adjustment of the screw 205. The latter adjustment of the plate 200 adjusts the force exerted by the spring 199 so as to determine the pressure at which the valve 195 will open. As shown in Figure 3, a cored passage 220 is formed in the manifold block 37 and leads from the passage 190 to a recessed portion 221 formed in the manifold block 37. The passage 220 is controlled by the valve 195 and is opened to the port 190 upon the valve 195 being biased to an open position by the force of the pressure medium in the inlet passage 106. The recess 221 opens into the recess 85, as shown in Figure 3, so that upon the valve 126 being closed on excess pressure being exerted in the passage 116, the valve 195 will open releasing such pressure to the atmosphere through the tubular member 78 leading to the overboard dump.

In the operation of the above device, it will be seen that upon energization of the solenoid 168, as upon operation of the inflatable ice eliminating system, the flap valve 125 is moved to a closed position while flap valve 126 is opened. The latter operation permits the air entering the passage 106 under pressure of the pump 6 to flow through chamber 115 and cored passage 116 into passage 100 where the radial vanes 123 give the air a centrifugal spin tending to separate the particles of oil from the air. The thus separated oil particles tend to drip down the inner side of the casing 35 and collect in the recessed receptacle 61. The air flow, moreover, passes downward and up through the perforated screen 96 into the filter pack 98 where the oil vapors are absorbed. The air then continues to flow upward and through the perforated top plate 98 into chamber 101. From chamber 101, the air passes through passages 102 and 103 into outlet passage 104. From passage 104 the air flows through outlet conduit 12 to the main pressure conduit 15 and through distributor valves 18 to the inflatable ice eliminating boots 3. Moreover, upon the pressure in the line 9 being in excess of a predetermined value the valve 195 will be biased to an open position and excess air will pass out through openings 190, 220 and 221, through recess 85 and out tube 78 to the overboard discharge.

Figure 5:
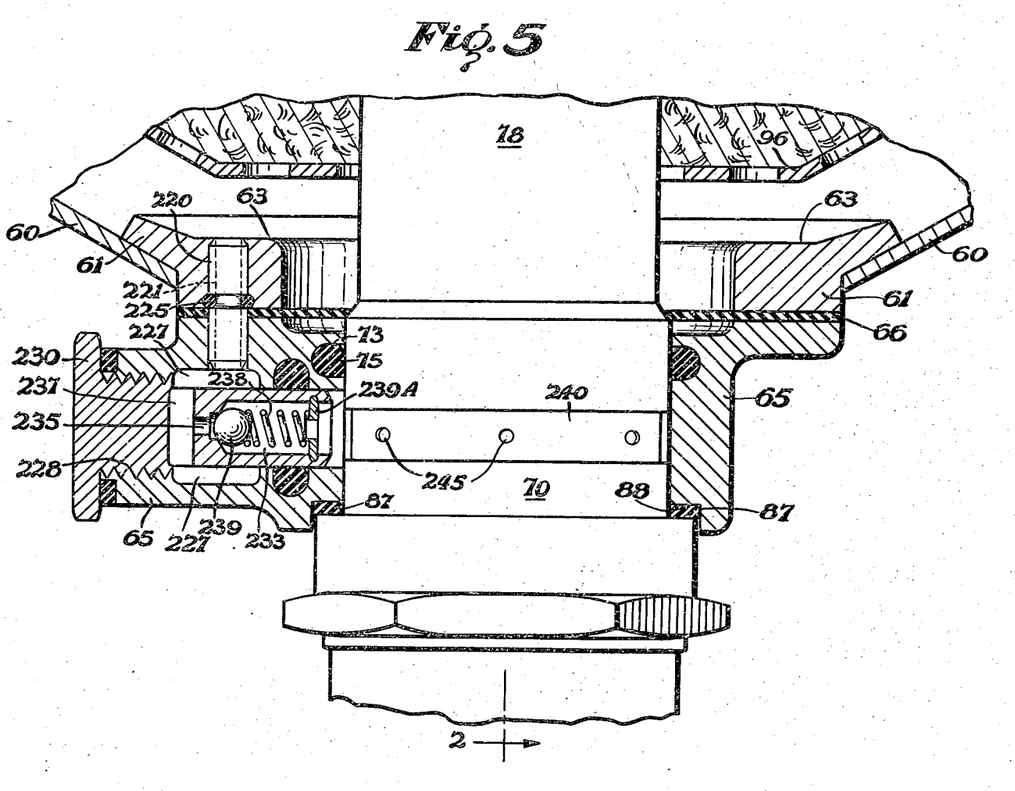
Figure 5 is an enlarged fragmentary sectional view of the oil discharge check valve arrangement of Figure 3.

The oil which is collected in the receptacle 60 is drained from the same through a pin 220 having a passage 221 extending longitudinally therein as indicated in dotted lines in Figures 3 and 5. The pin 220 is held in position by an annular sealing ring 225 formed of rubber or other suitable material and positioned in cooperating grooves formed in the pin and in the passage in the member 61 in which the pin 220 is inserted. The passage 221 in the pin 220 opens at one end into the recessed portion 63 of the receptacle 61 and at the opposite end into a passage 227. Projecting into the passage 227 and screw threadedly engaged therein at 228 is a valve stem 230.

The valve stem 230 has a passage 233 extending longitudinally therein and opening at one end into a passage in the member 65 through which the conduit 70 extends. A port 235 opens at the opposite end into radially extending ports 237. A ball valve 239 controls the opening of the port 235 into the passage 233. A spring 238 having one end anchored by a suitable fastening member 239A and the opposite end bearing upon the ball valve 239 biases the same to a position closing the port 235.

The conduit 70, as shown in Figures 2 and 3, has an annular groove 240 formed therein and cooperating with the open end of the passage 233. Formed in the groove 240 and opening through the conduit 70 are radially extending ports 245 which open into the interior of the passage 70.

Through the latter arrangement it will be seen that during the normal operation of the inflatable ice eliminating system, the oil collected in the receptacle 61 will be subjected to the normal superatmospheric pressure exerted through passage 100. The latter pressure will be exerted through the oil in passages 221, 235 and 237 so as to tend to bias the ball valve 239 to an open position. In the latter position the ball valve 239 permits the oil to bleed out through passage 233 and through ports 245 into the conduit 70. The oil is then discharged through the conduits 70 and 72 to the overboard dump.

However, when the solenoid 168 is de-energized as during the period when the inflatable ice eliminating system is not in operation, it will be seen that the port 183 will be closed to the chamber 149 through ball valve 180 and the superatmospheric pressure within the chamber 149 will augment the biasing force exerted by the spring 153 so as to close flap valve 126 and open flap valve 125. The latter action will of course permit the air under pressure of the pump 6 to exhaust directly to atmosphere through the conduit 78 leading to the overboard dump and will moreover terminate the pressure of the pump 6 acting through passage 100. The ball valve 239 is then biased to a closed position under force of the pressure acting through the tube 78 so as to prevent any air flow from backing up through the device 10 from the discharge tube 78.

It will be seen that through the latter arrangement, there has been provided novel means whereby the only air that will pass through the filter unit of the oil separator is that air that is actually required for boot operation, thereby increasing the life of the filter material 98 and reducing the size and cost of the device 10. Moreover air under pressure of the pump 6 and at an excessive pressure value is released through the valve 195 prior to its passing through the device 10. Further during the period when the ice eliminating system is not in operation the air under pressure of the pump 6 is exhausted directly to atmosphere through the conduit 78, rather than passing through the device 10

Although only one embodiment of the invention has been illustrated and described, various changes in the form and relative arrangements of the parts, which will not appear to those skilled in the art, may be made without departing from the scope of the invention. Reference is, therefore to be had to the appended claims for a definition of the limits of the invention.

What is claimed is:

1. A device for removing oil from oil ladened air, comprising, in combination, an outer casing, an inner casing mounted within said outer casing and positioned in spaced relation thereto so as to define a downwardly extending air passage between said casings, an air inlet conduit, means connecting said air inlet conduit to said first mentioned air passage, a plurality of radial vanes positioned in said first mentioned passage and between said outer and inner casing for imparting a spin to the oil laden air entering said first mentioned passage whereby the resulting forces are effective to cause the oil to separate from the air, a receptacle mounted at the lower end of said outer casing for collecting the separated oil, said inner casing having air outlet passage means through said inner casing and opening at the upper end of said outer casing, discharge means at the lower end of the outer casing, and valve means alternately operable for discharging said inlet air or said separated oil.

2. A device for removing oil from oil ladened air, comprising, in combination, an outer casing, an inner casing mounted within said outer casing and positioned in spaced relation thereto so as to define a downwardly extending air passage between said casings, an air inlet conduit, means connecting said air inlet conduit to said first mentioned air passage, a plurality of radial vanes positioned in said first mentioned passage and between said outer and inner casing for imparting a spin to the oil laden air entering said first mentioned passage whereby the resulting forces are effective to cause the oil to separate from the air, a receptacle mounted at the lower end of said outer casing for collecting the separated oil, said inner casing having air outlet passage means through said inner casing and opening at the upper end of said outer casing, said receptacle having an oil discharge passage extending downwardly from said receptacle, a discharge conduit extending downwardly through said receptacle, said oil discharge passage opening into said conduit, and means alternately operable for discharging said inlet air or said separated oil through said discharge conduit.

3. A device for removing oil from oil ladened air, comprising, in combination, an outer casing, an inner casing mounted within said outer casing and positioned in spaced relation thereto so as to define a downwardly extending air passage between said casings, an air inlet conduit, means connecting said air inlet conduit to said first mentioned air passage, a plurality of radial vanes positioned in said first mentioned passage and between said outer and inner casing for imparting a spin to the oil laden air entering said first mentioned passage whereby the resulting forces are effective to cause the oil to separate from the air, a receptacle mounted at the lower end of said outer casing for collecting the separated oil, said inner casing having air outlet passage means through said inner casing and opening at the upper end of said outer casing, a discharge conduit extending downwardly through said receptacle, and means alternately operable for discharging said inlet air or said separated oil through said discharge conduit.

4. A device of the character described, comprising, in combination, a casing having air inlet and outlet means, means carried by said casing for removing oil from oil laden air, receptacle means for collecting the separated oil, a discharge conduit, and means alternately operable for connecting said air inlet or said receptacle means to said discharge conduit.

5. For use in an ice eliminating system for aircraft having an inflatable unit; a device comprising, in combination, a casing having air inlet and air outlet means, said air outlet means for connection to said unit, means carried by said casing for separating oil from oil laden air, a discharge conduit opening from said casing to atmosphere, and valve means carried by said casing and alternately operable for closing said air inlet means to said separating means or said discharge conduit.

6. A device for removing oil from oil ladened air, comprising, in combination, an outer casing, an inner casing mounted within said outer casing and positioned in spaced relation thereto so as to define a downwardly extending air passage between said casings, an air inlet conduit, means connecting said air inlet conduit to said first mentioned air passage, a plurality of radial vanes positioned in said first mentioned passage and between said outer and inner casing for imparting a spin to the oil laden air entering said first mentioned passage whereby the resulting forces are effective to cause the oil to separate from the air, a receptacle mounted at the lower end of said outer casing for collecting the separated oil, an air outlet conduit provided at the upper end of said inner casing, air filter means carried by said inner casing for removing oil vapors from said oil laden air in passing through said inner casing to said air outlet conduit, a discharge conduit opening through the upper end of said inner and outer casing and extending downwardly through the lower end thereof, means connecting said air inlet conduit to said discharge conduit, and valve means for alternately opening and closing the connecting means for said air inlet conduit.

7. A device for removing oil from oil ladened air, comprising, in combination, an outer casing, an inner casing mounted within said outer casing and positioned in spaced relation thereto so as to define a downwardly extending air passage between said casings, an air inlet conduit, means connecting said air inlet conduit to said first mentioned air passage, a plurality of radial vanes positioned in said first mentioned passage and between said outer and inner casing for imparting a spin to the oil laden air entering said first mentioned passage whereby the resulting forces are effective to cause the oil to separate from the air, a receptacle mounted at the lower end of said outer casing for collecting the separated oil, an air outlet conduit provided at the upper end of said inner casing, air filter means carried by said inner casing for removing oil vapors from said oil laden air in passing through said inner casing to said air outlet conduit, a discharge conduit opening through the upper end of said inner and outer casing and extending downwardly through the lower end thereof, means connecting said air inlet conduit to said discharge conduit, valve means for alternately opening and closing the connecting means from said air inlet conduit, and said receptacle having an oil discharge passage from said receptacle into said discharge conduit for the discharge of said separated oil through said discharge conduit.

8. A device for removing oil from oil ladened air, comprising, in combination, an outer casing, an inner casing mounted within said outer casing and positioned in spaced relation thereto so as to define a downwardly extending air passage between said casings, an air inlet conduit, means connecting said air inlet conduit to said first mentioned air passage, a plurality of radial vanes positioned in said first mentioned passage and between said outer and inner casing for imparting a spin to the oil laden air entering said first mentioned passage whereby the resulting forces are effective to cause the oil to separate from the air, a receptacle mounted at the lower end of said outer casing for collecting the separated oil, an air outlet conduit provided at the upper end of said inner casing, air filter means carried by said inner casing for removing oil vapors from said oil laden air in passing through said inner casing to said air outlet conduit, a discharge conduit opening through the upper end of said inner and outer casing and extending downwardly through the lower end thereof, means connecting said air inlet conduit to said discharge conduit, valve means for alternately opening and closing the connecting means from said air inlet conduit, said receptacle having an oil discharge passage from said receptacle into said discharge conduit for the discharge of said separated oil through said discharge conduit, and a check valve in said discharge passage operable under the air pressure within the first mentioned passage for opening said discharge passage so as to permit said separated oil to bleed from said receptacle into said discharge conduit upon said connection from said air inlet conduit to said first mentioned passage being opened by said valve means.

9. A device for removing oil from oil ladened air, comprising, in combination, an outer casing, an inner casing mounted within said outer casing and positioned in spaced relation thereto so as to define a downwardly extending air passage between said casings, an air inlet conduit, means connecting said air inlet conduit to said first mentioned air passage, a plurality of radial vanes positioned in said first mentioned passage and between said outer and inner casing for imparting a spin to the oil laden air entering said first mentioned passage whereby the resulting forces are effective to cause the oil to separate from the air, a receptacle mounted at the lower end of said outer casing for collecting the separated oil, an air outlet conduit provided at the upper end of said inner casing, air filter means carried by said inner casing for removing oil vapors from said oil laden air in passing through said inner casing to said air outlet conduit, a discharge conduit opening through the upper end of said inner and outer casing and extending downwardly through the lower end thereof, means connecting said air inlet conduit to said discharge conduit, valve means for alternately opening and closing the connecting means from said air inlet conduit, said receptacle having an oil discharge passage from said receptacle into said discharge conduit for the discharge of said separated oil through said discharge conduit, a check valve in said discharge passage operable under the air pressure within the first mentioned passage for opening said discharge passage so as to permit said separated oil to bleed from said receptacle into said discharge conduit upon said connection from said inlet conduit to said first mentioned passage being opened by said valve means, and a pressure release valve for connecting said air inlet conduit to said discharge conduit upon a predetermined air pressure being applied through said air inlet conduit.

10. For use in an ice eliminating system for aircraft having an inflatable unit; a device comprising, in combination, a casing having air inlet and air outlet means, said air outlet means for connection to said unit, means carried by said casing for separating oil from oil laden air, a discharge conduit through said casing, and solenoid operated valve means carried by said casing and alternately operable for opening said air inlet means to said separating means and closing said discharge conduit or opening said inlet means to said discharge conduit and closing inlet means to said separating means.

11. A device of the character described, comprising, in combination, a casing, an air inlet conduit and an air outlet conduit opening into and out of said casing, means carried by said casing for separating oil from oil laden air, a discharge conduit extending through said casing, and a pressure release valve for connecting said air inlet conduit to said discharge conduit so as to release inlet air from passing through said oil separating means upon air pressure in excess of a predetermined value being applied through said air inlet conduit.

12. A device of the character described, comprising, in combination, a casing having air inlet and air outlet means, means carried by said casing for separating oil from oil laden air, a discharge conduit through said casing, a pressure release valve for connecting said air inlet means to said discharge conduit upon a predetermined air pressure being applied at said air inlet means, and separate operator-operative valve means carried by said casing and alternately operable for opening said air inlet means to said separating means and closing said discharge conduit or opening said air inlet means to said discharge conduit and closing said air inlet means to said separating means.

13. In an ice eliminating system for aircraft of the class including a plurality of inflatable boots formed of a rubber like material and mounted on airfoil surfaces of said aircraft, a pump for providing a source of superatmospheric air pressure, air distributor valves for controlling the inflation and deflation of said boots, air conduit means for conducting the superatmospheric air pressure from said pump to said distributor valves for inflating said boots, electrical circuit means including a manually operable switch means for controlling the operation of said air distributor valves, and means for removing oil from the oil ladened air from said pump; the improvement comprising an air discharge conduit leading to atmosphere, means for connecting said discharge conduit to the air inlet side of said oil removing means, valve means for opening and closing said connecting means, and electromagnetic means for controlling the operation of said valve means, said electromagnetic means connected in said electrical circuit means and controlled through operation of said switch means in such a manner as to close said connecting means to said discharge conduit during operation of said system and open said connecting means to said discharge conduit at such times as said system is not in an operating condition.

14. In an ice eliminating system for aircraft of the class including a plurality of inflatable boots formed of a rubber like material and mounted on airfoil surfaces of said aircraft, a pump for providing a source of superatmospheric air pressure for inflating said boots, means for removing oil from the oil ladened air from said pump, and said means connected between said pump and said boots; the improvement comprising an air discharge conduit leading to the atmosphere, valve means for alternately connecting the superatmospheric air pressure from said pump to said discharge conduit or to said boots through said oil removing means, electromagnetic means for operating said valve means, and an electrical circuit means for controlling the operation of said system and said electromagnetic means, including a switch for manually effecting simultaneous operation of said valve means and said ice eliminating system.

15. For use in an ice eliminating system for aircraft of the class including an inflatable boot formed of a rubber like material and mounted on an airfoil surface of said aircraft, and a pump for providing a source of superatmospheric air pressure for inflating said boot; a device comprising in combination a casing, an air inlet conduit opening into said casing and adapted to be connected to said pump, an air outlet conduit from said casing for connection to said boot, oil separating means carried by said casing for removing oil from oil ladened air from said pump, said oil separating means connected in said casing between the air inlet conduit and said air outlet conduit, an air discharge conduit opening from said casing to atmosphere, and valve means for shifting the connection of said air inlet conduit from said oil separating means to said air discharge conduit.

DONALD M. LAWRENCE.

REFERENCES CITED

The following references are of record in the file of this patent:

UNITED STATES PATENTS

| Number | Name | Date |
|---|---|---|
| 343,251 | Neracher | June 8, 1886 |
| 581,448 | White | Apr. 27, 1897 |
| 849,641 | Sadler | Apr. 9, 1907 |
| 1,429,713 | Cazier et al. | Sept. 19, 1922 |
| 1,499,710 | Weisgerber | July 1, 1924 |
| 1,547,429 | Ludeman | July 26, 1925 |
| 1,854,010 | Woodford | Apr. 12, 1932 |
| 2,038,039 | Gregg | Apr. 21, 1936 |
| 2,174,528 | Prentiss | Oct. 3, 1939 |
| 2,327,046 | Hunter | Aug. 17, 1943 |
| 2,422,624 | Hunter | June 17, 1947 |